United States Patent [19]

Tanaka et al.

[11] Patent Number: 5,185,216
[45] Date of Patent: Feb. 9, 1993

[54] COMPOSITE PLATING FILM FOR SLIDING MEMBER

[75] Inventors: Tadashi Tanaka, Konan; Masaaki Sakamoto, Nagoya; Motomu Wada, Owariasahi; Hideo Ishikawa, Komaki; Sowjun Matsumura, Hirakata; Tadashi Chiba, Hirakata; Kiyoshi Asakawa, Hirakata; Syoichi Oohora, Nagoya, all of Japan

[73] Assignees: Daido Metal Company Ltd., Nagoya; C. Uyemura & Company, Ltd., Osaka, both of Japan

[21] Appl. No.: 574,701

[22] Filed: Aug. 29, 1990

[30] Foreign Application Priority Data

Nov. 20, 1989 [JP] Japan .................................. 1-301469
Feb. 28, 1990 [JP] Japan .................................. 2-049132

[51] Int. Cl.⁵ .................................................. F16C 33/12
[52] U.S. Cl. .................................. 428/614; 428/645; 428/935; 384/912; 384/913
[58] Field of Search ............... 428/645, 614, 939, 650, 428/677, 653, 935; 384/912, 913; 204/16; 252/12.2

[56] References Cited

U.S. PATENT DOCUMENTS

| 2,605,149 | 7/1952 | Schueter et al. ............... 428/645 |
| 3,180,008 | 4/1965 | Elderkin et al. ............... 428/645 |
| 3,365,777 | 1/1968 | MacDonald et al. ........... 252/12.2 |
| 3,644,105 | 2/1972 | Selker et al. ................... 420/645 |
| 4,309,064 | 1/1982 | Fukuoka et al. ............... 384/912 |
| 4,334,926 | 6/1982 | Futamura et al. .............. 384/913 |
| 4,404,263 | 9/1983 | Hodes ............................. 426/632 |
| 4,877,696 | 10/1989 | Muto ............................ 428/645 |
| 4,884,772 | 12/1989 | Bergmann et al. ............. 428/610 |
| 4,900,639 | 2/1990 | Hodes et al. .................. 428/610 |
| 4,957,822 | 9/1990 | Steej et al. .................... 428/645 |

FOREIGN PATENT DOCUMENTS

| 1-320314 | 12/1989 | Japan ........................... 384/912 |
| 1311854 | 3/1973 | United Kingdom ............ 384/913 |
| 2186923A | 8/1987 | United Kingdom ............ 384/913 |

OTHER PUBLICATIONS

H. J. Wiesner et al., "Strengthening of Electrodeposited Lead and Lead Alloys", Plating, Apr. 1970, pp. 358–368.

P. B. Kadam et al., "High Temperature Creep Behavior of Lead-Based Particulate Composites", J. of Materials Science 18 (1983) 140–144.

Primary Examiner—John J. Zimmerman
Attorney, Agent, or Firm—Browdy and Neimark

[57] ABSTRACT

Disclosed is a composite plating film for sliding members, essentially containing at least one of the alloy elements selected from tin, indium, antimony, and copper; inorganic particles; and lead; the composition of the composite plating film being:

a) at least one of the alloy elements selected from tin, indium, antimony, and copper ... 2 to 30 weight % in total;
b) inorganic particles ... 0.3 to 25 volume %; and
c) lead ... the balance.

6 Claims, 3 Drawing Sheets

COMPOSITE PLATING FILM FOR SLIDING MEMBER

BACKGROUND OF THE INVENTION

This invention relates to a composite electroplating film to be utilized as a wear-resistant surface layer of a sliding member, e.g., the plain bearing, which is used in automobiles, ships, aircraft, electric machinery, OA equipment, machine tools, industrial machinery in general, etc.

Well-known examples of such a sliding member include a multi-layer product which is composed of: a steel backing-metal layer, a bearing copper alloy or aluminum alloy layer, an intermediate layer, and a lead alloy surface layer. U.S. Pat. Nos. 2,605,149 and 3,180,008, and JP-Bl-39-22498, etc. disclose alloys to be used as the material for the lead alloy surface layer of such a multi-layer product. In these alloys, the amount of the alloying elements (which are to be added to the lead), such as tin, copper, indium, etc., is changed in various ways with a view to improving their wear resistance and fatigue resistance characteristics. Such alloys are actually being used at the present time.

The improvement attained by these conventional alloys, however, is not sufficient for sliding members used in present day automobile engines. This is because, due to the demand for cost reduction, it has become a common practice today to use in an automobile engine a shaft which is made of cast iron, such as spheroidal graphite cast iron (e.g., JIS FCD70). The problem with such a cast iron shaft is that the surface layer of a receiving bearing of a multi-layer wears at an early stage because of projections (burrs) or the like existing around graphite areas on the shaft surface. As a result, part of the intermediate layer or of the bearing alloy layer is exposed, which rapidly causes seizure phenomenon. Even if the surface layer does not wear so badly as to cause seizure phenomenon, changes are caused in the gap (oil clearance) between the shaft and the bearing, which can cause noise and vibrations. Apart from this, the general tendency today is that a steel shaft for general use is used under high speed and high load conditions, so that the surface layer of a receiving bearing of a multi-layer is also subject to abrasion at an early stage, thus giving rise to a problem which is similar to that mentioned above.

SUMMARY OF THE INVENTION

This invention has been made in view of the above situation. It is accordingly an object of this invention to make it possible to prevent the surface layer of a sliding member made of a multi-layer product from wearing at an early stage.

In accordance with this invention, there is provided a composite electroplating film for sliding members, essentially containing at least one of alloy elements selected from tin, indium, antimony, and copper; inorganic particles; and lead, wherein the electroplating film comprises:

a) at least one of the alloy elements selected from tin, indium, antimony, and copper . . . 2 to 30 weight % in total;

b) inorganic particles . . . 0.3 to 25 volume %; and c) lead . . . the balance.

When the sliding member is a component of an internal combustion engine of an automobile, the thickness of its surface plating layer is generally in the range of 10 to 30 µm. This, however, should not be regarded as restrictive. A sliding member of a marine internal combustion engine, for example, is used under low surface pressure, so that the thickness of its surface plating layer can be in the range of 50 to 100 µm.

If a surface plating layer is interspersed with inorganic particles of a micron size, the following advantage is obtained: supposing, for example, that the sliding member is the main bearing of an internal combustion engine and is supporting the associated crank shaft, the surface plating layer can be protected from wear under a condition in which no oil film existing between the bearing and the crank shaft, which happens when, for example, the engine is started, since the relatively hard inorganic particles serve to protect matrix of the plating layer. Furthermore, the inorganic particles have the function of polishing the projections (burrs) or the like existing around the graphite areas on the surface of a revolving shaft of cast iron, which means they make the surface of the revolving shaft smooth, thereby the bearing as the sliding member is effectively protected from early abrasion.

Examples of the inorganic substance to be used as the particles for the composite plating film include: nitrides such as BN, TiN, AlN, and $Si_3N_4$; carbides such as SiC, TiC, $B_4C$, and TaC; fluorides such as $(CF)_n$ and $CaF_2$; sulfides such as $MoS_2$ and $WS_2$; and other types of substances such as $BaSO_4$, tungsten, molybdenum, etc. The size of the inorganic particles must be 15 [m or less. If the particle size is over 15 µm, toughness of the plating layer will deteriorate, thereby causing abrasion. Thus, the size of the inorganic particles should be 15 µm at the maximum, and preferably 10 µm or less. The amount of the particles contained in the surface plating layer is limited to 0.3 to 25 volume %. An amount of the particle of less than 0.3 volume % does not provide sufficient effect, whereas an amount greater than 25 volume % causes toughness of the plating layer to deteriorate. The most preferable amount is in the range of 0.5 to 20 volume %.

The alloying element(s), which consists of at least one of the elements tin, indium, antimony, and copper, is included in the surface plating layer in order to improve its mechanical strength and corrosion resistance against lubricating oil (particularly, deteriorated oil). If its amount is less than 2 weight the surface plating layer will exhibit a low mechanical strength, and its corrosion resistance property over a long period of time is poor. If the amount is higher than 30 weight %, the mechanical strength at high temperature of the surface plating layer becomes excessively low. Accordingly, the amount of the alloying element(s) should be in the range of 2 to 30 weight %. The most preferably amount is in the range of 3 to 25 weight %.

The sliding member in accordance with this invention is in a form of a multi-layer product, which is composed of a steel backing-metal layer, a bearing copper alloy or aluminum alloy layer, and a surface layer consisting of a plating film. The plating film contains the following: 2 to 30 weight % in total of at least one of the elements selected from tin, indium, antimony, and copper; 0.3 to 25 volume % in total of at least one kind of inorganic particles such as nitrides, carbides, fluorides, and sulfides; and the balance lead. It is recommended that an intermediate plating layer be provided between the surface layer of the plating film, and the bearing copper alloy or aluminum alloy layer. This intermediate plating layer may consist of one of the metals: nickel, cobalt, iron, copper, and silver, or an alloy containing that metal as a primary constituent. Of these metals, nickel, cobalt, and iron cause the tin, indium or antimony in the plating film as the surface layer, to be diffused into the base alloy (i.e., the bearing copper alloy), thereby preventing the strength and the corrosion resistance property of matrix of the base alloy from deteriorating, while copper and silver are advantageous in that, when combined with indium in the plating film through diffusion to generate an alloy, the generated alloy provides a desirable sliding characteristic. Further, when used for plating an aluminum alloy, copper and silver help to improve its seizure resistance property.

It is possible to omit one of the constituent layers (except for the surface layer) of the sliding member of the present invention, in case that surface contacting pressure in use is low, and that it is regarded as being sufficiently usable from a designing point of view, even if no lubricant oil film exists between the member and an opposer, retaining the surface layer.

DETAILED DESCRIPTION OF THE PREFERRED EMBODIMENTS

Figure 1:
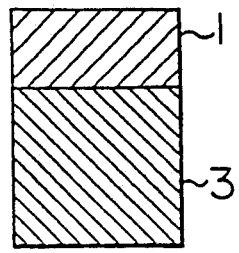
FIG. 1 is a sectional view showing a copper layer 3 and a lead alloy layer 1 thereon.

The example shown in FIG. 1 consists of a copper alloy layer 3 and a lead alloy layer 1 provided on it. The copper alloy used may be of a Cu-Pb type, Cu-Pb-Sn type, Cu-Zn type, or Cu-Sn type alloy. The lead alloy may be of a Pb-Sn type, Pb-Sn-Cu type, Pb-Sn-Sb type, Pb-In type, or Pb-In-Sn type alloy containing at least one kind of inorganic particles selected from the group of BN, SiC, $(CF)_n$, $CaF_2$, $MoS_2$, etc.

Figure 2:
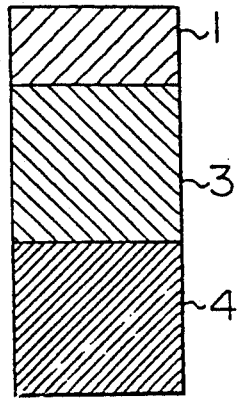
FIG. 2 is a sectional view showing a copper layer 3 and a lead alloy layer 1 laid on a steel backing-metal plate 4.

In the example shown in FIG. 2, the copper alloy layer 3 and the lead alloy layer 1 shown in FIG. 1 are laid on a steel backing-metal plate 4, which may be made of low carbon steel, high carbon steel, stainless steel, special steel or the like.

Figure 3:
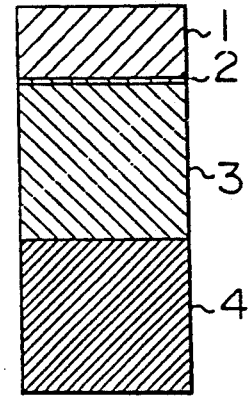
FIG. 3 is a sectional view showing an intermediate plating layer 2 between layer 1 and layer 3.

In the example shown in FIG. 3, an intermediate plating layer 2, which is made of one of the metals: nickel, cobalt, iron, silver, copper or an alloy thereof, is provided between the copper alloy layer 3 and the lead alloy layer 1 of FIG. 2.

Figure 4:
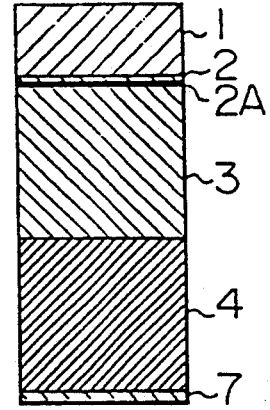
FIG. 4 is a sectional view showing an intermediate plating layer 2A made of a different material than intermediate layer 2, wherein both of the mentioned layers are disposed on alloy layer 3 and steel backing-metal plate 4.

In the example shown in FIG. 4, an intermediate plating layer 2A, which is not made of the same material as the intermediate layer 2 and which is made of one of the metals: nickel, cobalt, iron, silver, copper or an alloy thereof, is provided between the copper alloy layer 3 and the intermediate plating layer 2 of FIG. 3.

Figure 5:
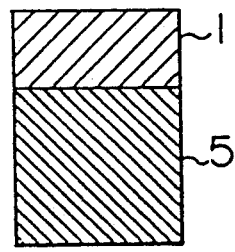
FIG. 5 is a sectional view showing a lead alloy layer 1 on an aluminum alloy layer 5.

In the example shown in FIG. 5, a lead alloy layer 1 is provided on an aluminum alloy layer 5, which may be of Al-Zn type, Al-Si type, Al-Sn type or the like.

Figure 6:
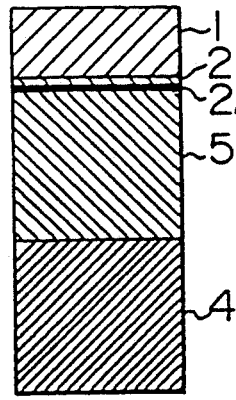
FIG. 6 is a sectional view showing a copper alloy layer 3 on FIG. 4 replaced by an aluminum alloy layer 5.

In the example shown in FIG. 6, the copper alloy layer 3 of FIG. 4 is replaced by an aluminum alloy layer 5.

Figure 7:
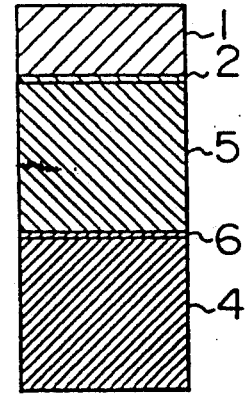
FIG. 7 is a sectional view showing a plating layer 6 as a bonding layer provided between steel backing-metal layer 4 and an aluminum alloy layer 5, and wherein an intermediate plating layer 2 is provided between aluminum alloy layer 5 and lead alloy layer 1.

In the example shown in FIG. 7, a plating layer 6 as a bonding layer, which is made of a metal selected from the group consisting of copper, nickel and aluminum or an alloy thereof, is provided between the steel backing-metal layer 4 and the aluminum alloy layer 5. Further, an intermediate plating layer 2 is provided between the aluminum alloy layer 5 and the lead alloy layer 1.

Figure 8:
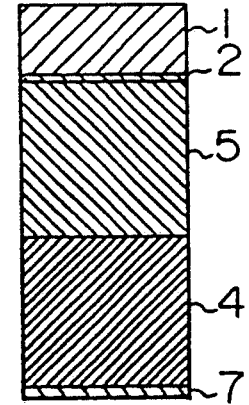
FIG. 8 is a sectional view which differs from FIG. 6 in that the intermediate plating layer 2A is omitted and the back surface of steel backing-metal layer 4 is covered with a plating layer 7 made of tin or a lead-tin alloy.

The example shown in FIG. 8 differs from that shown in FIG. 6 in that the intermediate plating layer 2A is omitted and that the back surface of the steel backing-metal layer 4 is covered with a plating layer 7, which is made of tin or a lead-tin alloy, for the purpose of rust prevention.

TEST EXAMPLE 1

A sintered layer of a copper alloy powder (Cu-23Pb-3.5Sn) was provided on one surface of a steel backing-metal plate, thus forming a bimetal. This bimetal was formed into a half-cylinder-shaped bearing (hereinafter referred to as the "half bearing") by cutting, press forming and machining. The half bearing thus obtained was subjected to the following pretreatments: defatting by solvent, electrolytic defatting, and acid pickling. Afterwards, the bimetal was subjected to electrolysis in a usual boric-fluoro-lead alloy plating bath, in which 20 to 40 g/liter of nitride particles (BN), which is inorganic particles, were dispersed, at a bath temperature of 25° C. and with a cathode current density of 3 to 5 A/dm$^2$, thereby forming, on the inner bearing surface (i.e., the surface of the sintered layer), a composite co-deposited alloy surface layer which is composed of lead alloy and inorganic particles. The respective thicknesses of the layers constituting the multi-layer product thus obtained were as follows: the surface layer: 20 μm; the copper alloy layer: 0.3 mm; the steel backing-metal plate: 1.2 mm. The size and composition of the inorganic particles are set forth in Table 1 (Specimen Nos. 1 to 3)

TEST EXAMPLE 2

A sintered layer of a copper alloy powder (Cu-23Pb-3.5Sn) was provided on one surface of a steel backing-metal plate, thus forming a bimetal. This bimetal was formed into a half bearing by cutting, press forming and machining. The half bearing thus obtained was subjected to the following pretreatments: defatting by solvent, electrolytic defatting, and acid pickling. Afterwards, an intermediate nickel plating layer with a thickness of 1.5 μm was formed on the inner bearing surface (i.e., the surface of the sintered layer) through electrolysis in a usual watt nickel plating bath at a bath temperature of 50° C. and with a cathode current density of 6A/dm$^2$. Further, a composite co-deposited alloy surface layer having a thickness of 20 μm was formed by a method similar to that of Test Example 1 using a lead alloy plating bath in which nitride particles (BN), which is inorganic particles, were dispersed. The respective thicknesses of the layers constituting the multi-layer product thus obtained were the same (except for the intermediate nickel plating layer) as in Test Example 1. The size and composition of the inorganic particles and the composition thereof are set forth in Table 1 (Specimen No. 4).

TEST EXAMPLE 3

A sintered layer of a copper alloy powder (Cu 23Pb-3.5Sn) was provided on one surface of a steel backing-metal plate, thus forming a bimetal. This bimetal was formed into a half bearing by cutting, press forming and machining. The half bearing thus obtained was subjected to the following pretreatments: defatting by solvent, electrolytic defatting, and acid pickling. Afterwards, an intermediate silver plating layer with a thickness of 1.5 μm was formed on the inner bearing surface (i.e., the surface of the sintered layer) through electrolysis in a usual silver-cyanide plating bath at a bath temperature of 30° C. and with a cathode current density of 1 A/dm$^2$. Further, a composite co-deposited alloy surface layer having a thickness of 20 μm was formed by a method similar to that of Test Example 1 using a lead alloy plating bath in which nitride particles (BN), which is inorganic particles, were dispersed. The respective thicknesses of the layers constituting the multi-layer product thus obtained (except for the intermediate silver plating layer) were the same as in Test Example 1. The size and composition of the inorganic particles and the composition thereof are set forth in Table 1 (Specimen No. 5).

TEST EXAMPLE 4 (Comparative Example)

A sintered layer of a copper alloy powder (Cu-23Pb-3.5Sn) was provided on one surface of a steel backing-metal plate, thus forming a bimetal. This bimetal was formed into a half bearing by cutting, press forming and machining. The half bearing thus obtained was subjected to the following pretreatments: defatting by solvent, electrolytic defatting, and acid pickling. Afterwards, the bimetal was subjected to electrolysis in a usual boric-fluoro-lead alloy plating bath, thereby forming, on the inner bearing surface (i.e., the surface of the sintered layer), a 20 μm thick surface layer, whose composition is set forth in Table 1 (Specimen Nos. 6 to 8). This test example is the same as Test Example 1 except for the fact that no inorganic particle was dispersed in the lead alloy plating bath.

TEST EXAMPLE 5

A steel backing-metal plate was united with a bearing aluminum alloy sheet (Al-6Sn-1Cu-1Ni) by rolling to form an integral metal product, which was then annealed for four hours at a temperature of 350° C., thereby obtaining a bimetal. As in Test Example 1, this bimetal was formed into a half bearing by cutting, press forming, and machining. The bearing thus obtained was subjected to the following processes: defatting by solvent; well-known alkaline etching (a pretreatment for aluminum alloys); acid pickling; and zinc substitution. Afterwards, an intermediate nickel plating layer having a thickness of 2.0 μm was formed on the bearing through electrolysis using a watt nickel plating bath, at a bath temperature of 50° C. and with a cathode current density of 6 A/dm$^2$. Further, a composite co-deposited alloy surface layer was obtained by a method similar to that of Test Example 1, using a lead alloy plating bath in which 20 to 40 g/liter of carbide particles (SiC), which is inorganic particles, were dispersed. The respective thicknesses of the layers constituting the bearing were nickel plating layer: 2.0 μm; the aluminum alloy layer: 0.3 mm; the steel backing-metal plate: 1.2 mm. The size and composition of the inorganic particles are set forth in Table 1 (Specimen Nos. 9 to 11).

TEST EXAMPLE 6

A steel backing-metal plate was united with a bearing aluminum alloy sheet (Al-6Sn-1Cu-1Ni) by rolling to form an integral metal product, which was then annealed for four hours at a temperature of 350° C., thereby obtaining a bimetal. As in Test Example 1, this bimetal was formed into a half bearing by cutting, press forming, and machining. The bearing thus obtained was subjected to the following processes: defatting by solvent; well-known alkaline etching (a pretreatment for aluminum alloys); acid pickling; and zinc substitution. Afterwards, an intermediate copper plating layer having a thickness of 1.5 μm was formed on the bearing through electrolysis using a copper-cyanide striking plating bath, which is applicable to aluminum alloys, at a bath temperature of 50° C. and with a cathode current density of 1.5 A/dm$^2$. Further, a composite co-deposited alloy surface layer having a thickness of 20 μm was formed by a method similar to that of Test Example 5. The respective thicknesses of the layers constituting the bearing (except for the intermediate copper plating layer) were the same as in Test Example 4. The size and composition of the inorganic particles are set forth in Table 1 (Specimen No. 12).

TEST EXAMPLE 7 (Comparative Example)

A steel backing-metal plate was united with a bearing aluminum alloy sheet (Al-6Sn-1Cu-1Ni) by rolling to form an integral metal product, which was then annealed for four hours at a temperature of 350° C., thereby obtaining a bimetal. As in Test Example 1, this bimetal was formed into a half bearing by cutting, press forming, and machining. The bearing thus obtained was subjected to the following processes: defatting by solvent; well-known alkaline etching (a pretreatment for aluminum alloys); acid pickling; and zinc substitution. Afterwardsm an intermediate nickel plating layer having a thickness of 2.0 82 m was formed on the bearing through electrolysis using a watt nickel plating bath, at a bath temperature of 50° C. and with a cathode current density of 6 A/dm$^2$. Further, a lead alloy layer having the composition shown in Table 1 and a thickness of 20 μm was obtained by the usual electrolysis method using a lead alloy plating bath (Specimen Nos. 13 and 14). This example is the same as Test Example 5 except for the fact that no inorganic particle was dispersed in the lead alloy plating bath.

TEST EXAMPLE 8 (Comparative Example)

A sintered layer of a copper alloy powder (Cu-23Pb-3.5Sn) was provided on one surface of a steel backing-metal plate, thus forming a bimetal. This bimetal was formed into a half-bearing by cutting, press forming and machining. The half bearing thus obtained was subjected to the following pretreatments: defatting by solvent, electrolytic defatting, and acid pickling. Afterwards, an intermediate nickel plating layer with a thickness of 1.5 μm was formed on the inner bearing surface (e.g., the surface of the sintered layer) through electrolysis in a usual watt nickel plating bath at a bath temperature of 50° C. and with a cathode current density of 6 A/dm$^2$. Further, a surface layer having the composition shown in Table 1 and a thickness of 20 μm was obtained through electrolysis using a usual boric-fluoro lead alloy plating bath (Specimen Nos. 15 and 16). This example is identical inorganic particle was dispersed in the lead alloy plating bath.

TEST EXAMPLE 9

Other types of composite co-deposited alloy surface layers were obtained by dispersing various kinds of inorganic particles in the same manner as in the above test examples The results are shown in Table 1. (Specimen Nos. 17 to 30).

ABRASION TEST AND SEIZURE TEST

An abrasion test and a seizure test were performed for each of the specimens obtained in accordance with the above test examples. The test conditions are shown in Table 2 and the test results in FIGS. 9a and 9b.

TABLE 2-continued

| | Test conditions | |
|---|---|---|
| Abrasion test | | Seizure test |
| Opposite material: | FCD 70 | Opposite material: | FCD 70 |
| Test load: | 1000 Kgf/cm$^2$ | Test load: | — |
| Test time: | 100 hours | Test time: | — |
| Method of evaluation: The degree of abrasion was expressed by the reduction of the surface layer thickness in μm. | | Method of evaluation: An additional load of 50 Kgf/cm$^2$ was accumulatively applied each 10 minutes with the initial load being 100 Kgf/cm$^2$ A back surface temperature of 220° C. or more or a torque of 50 kgf · cm or more was regarded as a sign of seizure. | |

Figure 9A:
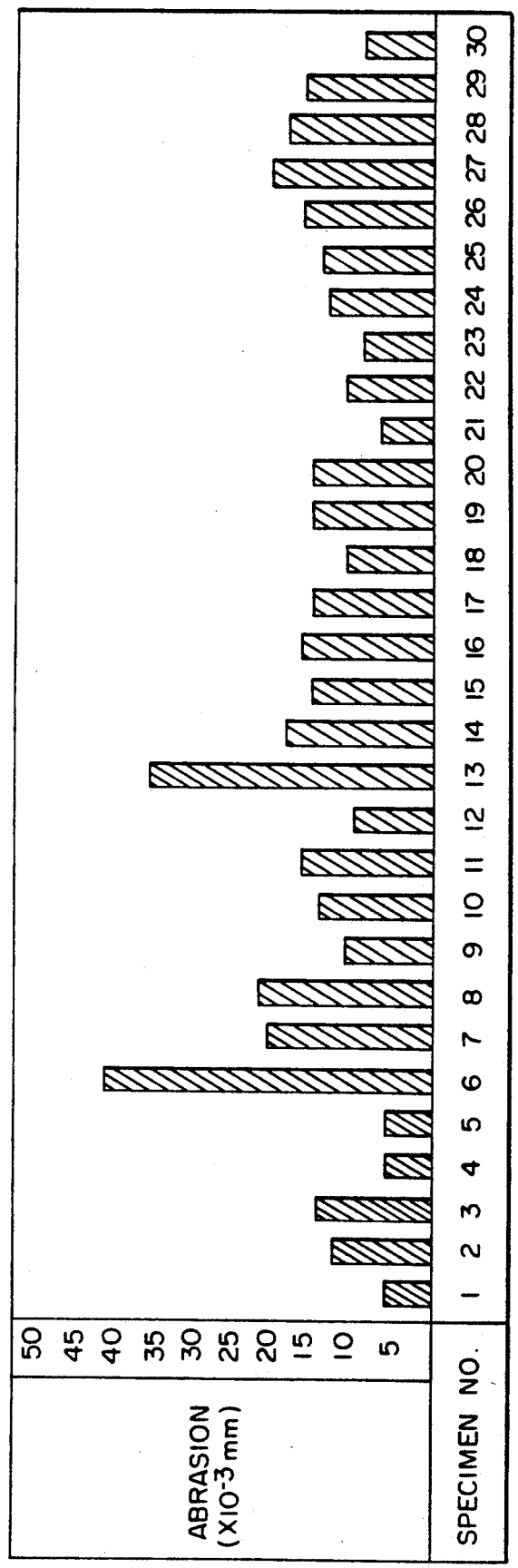
FIG. 9a is a graph showing the results of a wear resistance test.
Figure 9B:
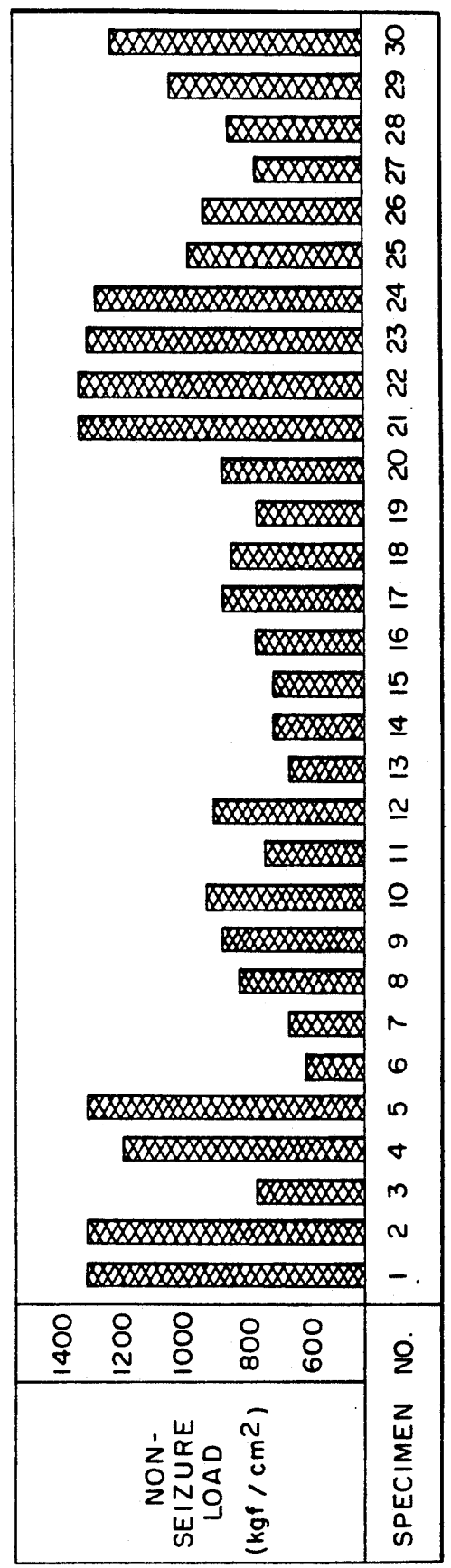
FIG. 9b is a graph illustrating the results of a seizure resistance test.

Evaluation of the Test Results and the Advantages of the Present Invention a) As can be seen from the degrees of abrasion shown in FIGS. 9a and 9b, the products containing 0.3 to 25 volume % of inorganic particles in their surface layers suffered less abrasion than those containing no inorganic particle. Thus, the provision of inorganic particles are very effective in improving wear resistance property of sliding members.

b) The sliding members in accordance with this invention exerted no undesirable influence on the test shafts, i.e., the opposite members to them. Surprisingly, the bearings which contained 5 volume % or more of BN or SiC in their surface layers even diminished the surface roughness of the associated test shafts (that is, made their surfaces smoother than they had been before the tests). In other words, the inorganic particles in the

TABLE 1

| | | | Bearing Material Composition | | | | | | | | | | |
|---|---|---|---|---|---|---|---|---|---|---|---|---|---|
| | | | Intermediate layer | | | | | | | Surface | | | Co-deposited |
| Test Example | Specimen No. | Bearing alloy | Element | Thickness (μm) | Pb | Sn | Cu | In | Sb | layer thickness (μm) | Particles Type | Size | particles Vol. (%) |
| Present invention | 1 | 1 | Cu alloy | — | — | Bal. | 10 | — | — | | 20 | BN | 5 | 12 |
| | | 2 | " | — | — | " | " | — | — | | " | " | 10 | " |
| | | 3 | " | — | — | " | " | — | — | | " | " | 15 | " |
| | 2 | 4 | " | Ni | 1.5 | " | " | — | — | | " | " | 5 | " |
| | 3 | 5 | " | Ag | 1.5 | " | " | — | — | | " | " | 5 | " |
| Comparative Example | 4 | 6 | " | — | — | " | " | — | — | | " | — | — | — |
| | | 7 | " | — | — | " | " | 2 | — | | " | — | — | — |
| | | 8 | " | — | — | " | " | — | 10 | | " | — | — | — |
| Present invention | 5 | 9 | Al alloy | Ni | 2.0 | " | " | — | — | | 20 | SiC | 5 | 10 |
| | | 10 | " | " | " | " | " | — | — | | " | " | 10 | " |
| | | 11 | " | " | " | " | " | — | — | | " | " | 15 | " |
| | 6 | 12 | " | Cu | 1.5 | " | " | — | — | | " | " | 5 | " |
| Comparative Example | 7 | 13 | " | Ni | 2.0 | " | " | — | — | | " | — | — | — |
| | | 14 | " | " | " | " | " | 2 | — | | " | — | — | — |
| | 8 | 15 | Cu alloy | Ni | 1.5 | Bal. | 10 | 2 | — | | 20 | — | — | — |
| | | 16 | " | " | " | " | " | " | 10 | | " | — | — | — |
| Present invention | 9 | 17 | " | — | — | " | " | — | — | | " | CFn | 10 | 5 |
| | | 18 | " | — | — | " | " | — | — | 10 | " | " | 10 | 10 |
| | | 19 | " | — | — | " | " | — | — | | " | " | 10 | 30 |
| | | 20 | " | — | — | " | " | — | — | | " | " | 5 | 10 |
| | | 21 | " | — | — | " | " | — | — | | " | MoS | 5 | 10 |
| | | 22 | " | — | — | " | " | — | — | | " | " | 10 | 10 |
| | | 23 | Al Alloy | Ni | 2.0 | " | " | — | — | | " | " | 5 | 10 |
| | | 24 | " | " | " | " | " | — | — | | " | " | 10 | 10 |
| | | 25 | " | " | " | " | " | — | — | 5 | " | BN | 5 | 10 |
| | | 26 | " | " | " | " | " | — | — | 10 | " | " | 10 | 10 |
| | | 27 | Cu Alloy | Ni | 1.5 | " | " | — | — | — | " | SiC | 5 | 0.3 |
| | | 28 | " | " | " | " | " | — | — | — | " | " | " | 0.5 |
| | | 29 | " | " | " | " | " | — | — | — | " | " | " | 1.0 |
| | | 30 | " | " | " | " | " | — | — | — | " | " | " | 3.0 |

TABLE 2

| | Test conditions | | |
|---|---|---|---|
| Abrasion test | | Seizure test | |
| Method: | dynamic load abrasion test | Method: | Static load seizure test |
| Lubricating oil: | SAE 20 | Lubricating oil: | SAE 30 |
| Temperature: | 100° C. | Temperature: | 100° C. |
| Speed of revolution: | 3250 r.p.m. | Speed of revolution: | 3600 r.p.m. | surface layers obviously possess the function of polishing the test shafts that are made of cast iron.

c) The specimens having less than 0.3 volume % of co-deposited inorganic particles within their surface layers exhibit a rather poor wear resistance property, while, with the specimens whose inorganic particles content is 25 volume % or more, the fatigue strength of the surface layer matrix is rather low, so that they are subject to local flaking, which leads to deterioration in wear resistance property.

d) It can be seen from FIGS. 9a and 9b, that the maximum load not involving seizure is higher in the case of surface layers containing 0.3 to 25 volume % of inorganic particles than in the case of surface layers which contain no inorganic particle. This is due to the fact that the inorganic particles help to prevent seizure from occurring when, for example, the shaft and the bearing surface are held in contact with each other under high speed and high load conditions with no lubricating oil film existing between them.

e) A co-deposited inorganic particles amount of less than 0.3 volume % will not provide sufficient effect, whereas, co-deposition amount of over 25 volume % will cause the toughness of the bearing to deteriorate, thereby increasing the surface roughness of the opposite member, i.e., the associated shaft, which can, in its turn, cause the bearing to run out of lubricating film, with the result that the maximum load at which seizure can be avoided (non-seizure load) becomes lower.

f) If the size of the inorganic particles in the surface layer is over 15 µm, the surface of the associated shaft, i.e., the opposite member to the sliding member, is likely to become rougher, thereby lowering the non seizure load.

g) A sliding member including an intermediate plating layer always exhibits more satisfactory properties than one including no intermediate plating layer. This is due to the fact that the diffusion of tin, indium or antimony in the lead alloy layer is prevented by this intermediate plating layer, thereby improving the sliding characteristic of the bearing.

What is claimed is:

1. A composite electroplating film for sliding members, containing at least one alloy element selected from tin, indium, antimony, and copper; inorganic particles selected from the nitride, carbide, fluoride and sulfide; and lead, wherein the composition of said composite electroplating film consisting essentially of:
   a) at least one of the alloy elements selected from tin, indium, antimony, and copper in amounts of from 2 to 30 weight % in total;
   b) amounts of said inorganic particles in amounts of from 0.3 to 25 volume %; and
   c) a balance of lead.

2. A composite electroplating film as claimed in claim 1, wherein the maximum diameter of said inorganic particles is 15 µm.

3. A sliding member comprising: a steel backing-metal layer, a bearing copper alloy or aluminum alloy layer, and a surface layer consisting of a composite electroplating film;
   said composite electroplating film containing at least one alloy element selected from tin, indium, antimony, and copper; inorganic particles selected from nitride, carbide, fluoride and sulfide and lead; wherein the composition of the electroplating film consists of:
   d) at least one of the alloy elements selected from tin, indium, antimony, and copper in amounts of from 2 to 30 weight % in total;
   e) inorganic particles in amounts of from 0.3 to 25 volume %; and
   f) a balance of lead.

4. A sliding member as claimed in claim 3, wherein the maximum diameter of said inorganic particles is 15 µm.

5. A sliding member as claimed in claim 3, wherein an intermediate plating layer is provided between said composite electroplating film, which constitutes said surface layer, and said bearing copper alloy or aluminum alloy layer, said intermediate plating layer being made of a metal selected from nickel, cobalt, iron, copper, and silver, or an alloy which contains said metal as the main constituent.

6. A sliding member as claimed in claim 3, wherein a bonding layer is provided between said steel backing-metal layer and said bearing copper alloy or aluminum alloy layer, said bonding layer being made of a metal selected from copper, nickel or aluminum, or an alloy which contains said metal as the main constituent.

* * * * *